Aug. 18, 1936.                O. WITTEL                2,051,192
                         PHOTOGRAPHIC CAMERA
                         Filed June 26, 1935           3 Sheets-Sheet 1

INVENTOR:
Otto Wittel,
BY
ATTORNEYS.

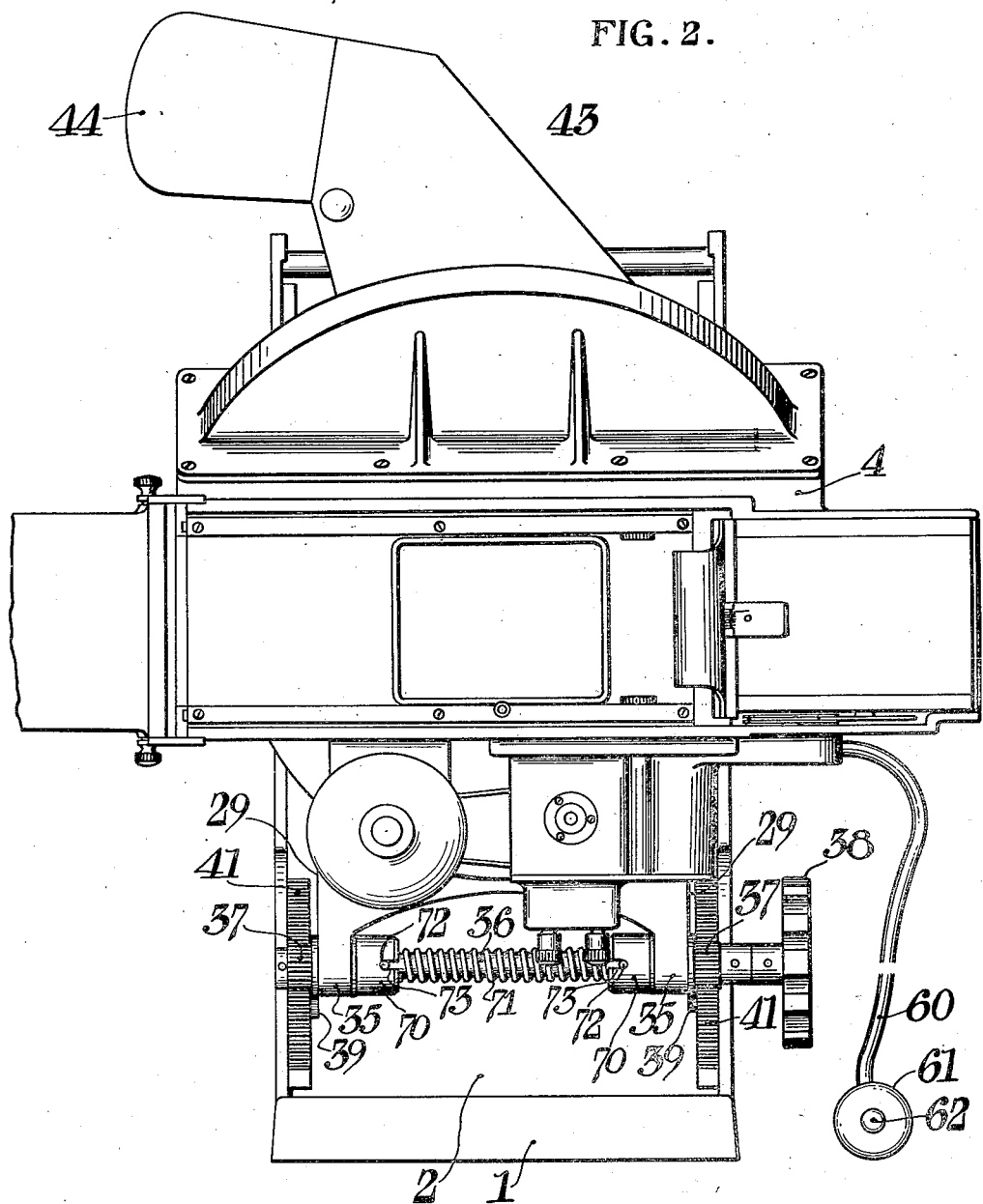

Aug. 18, 1936.   O. WITTEL   2,051,192
PHOTOGRAPHIC CAMERA
Filed June 26, 1935   3 Sheets-Sheet 3
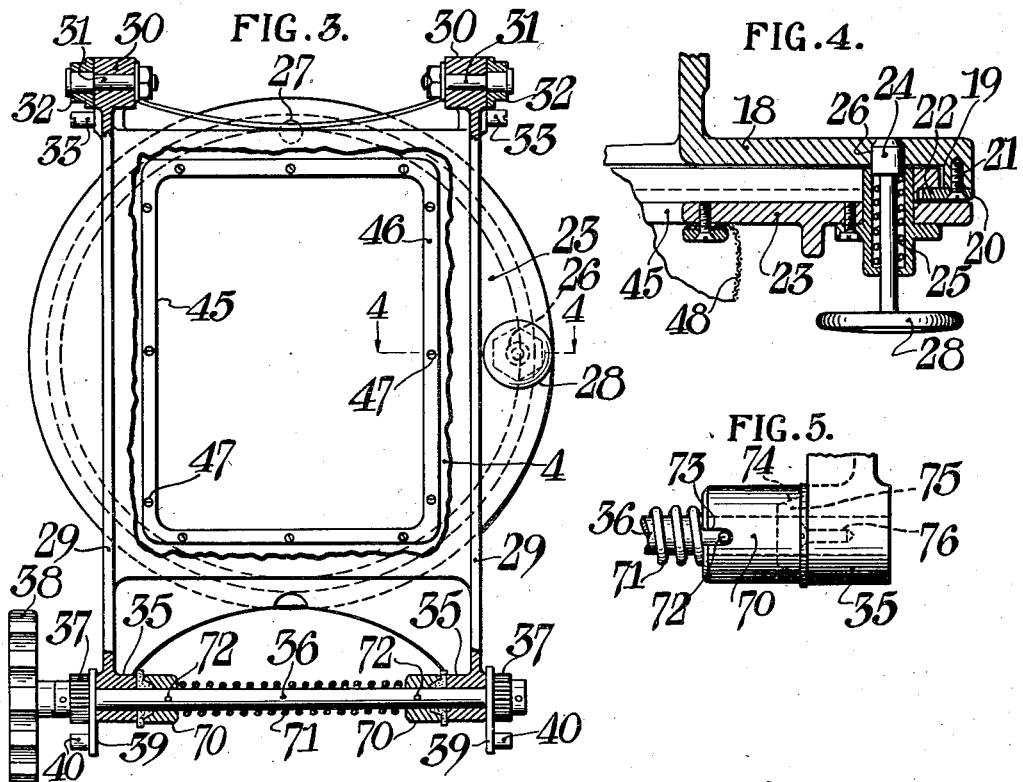
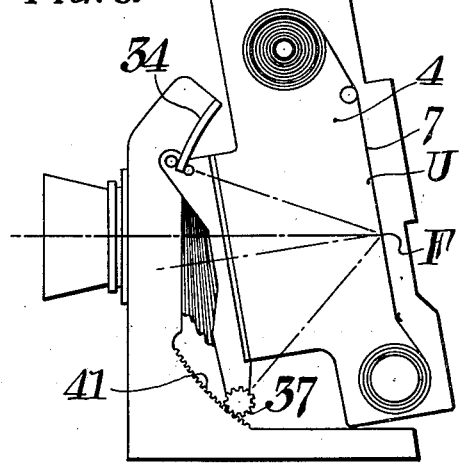
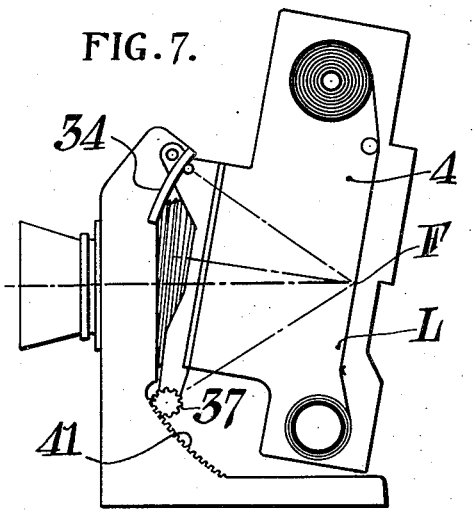
INVENTOR:
Otto Wittel,
BY Newton M. Perrins
Donald H. Stewart
ATTORNEYS.

Patented Aug. 18, 1936

2,051,192

UNITED STATES PATENT OFFICE 2,051,192

PHOTOGRAPHIC CAMERA

Otto Wittel, Rochester, N. Y., assignor to Eastman Kodak Company, Rochester, N. Y., a corporation of New York Application June 26, 1935, Serial No. 28,521

18 Claims. (Cl. 95—50)

This invention relates to photography, and more particularly to a photographic camera by which a series of pictures can be taken in rapid succession. One object of my invention is to provide a camera, adapted for use in studios, which can be easily and quickly operated. Another object of my invention is to provide a camera in which the lens board of the camera is rigidly mounted, this part of the camera supporting the entire camera body. Another object of my invention is to provide a camera with a lens board having curved tracks on which wheels supporting the camera body may move to adjust the camera body relative to the lens board. Another object of my invention is to provide a novel type of revoluble mount for the camera body. Still another object of my invention is to provide a camera body which can be adjusted on its support and rocked about the axis of the camera objective, and other objects will appear from the following specification, the novel features being particularly pointed out in the claims at the end thereof.

In a great many portrait studios projection prints are made, that is, the final print which goes to the customer is of a much larger size than the original negative. Such prints are made by projection or enlarging and, because of the new fine grain film and developers, it is now possible to make enlarged prints which retain all of the qualities shown in the negative and which appear to be contact prints. The present invention is particularly directed to a camera adapted to make one or more pictures rapidly on a film of a comparatively small size, each exposure may be approximately 2 x 3". It is obvious that the camera is also adapted to be used with film of any other desirable size, this size merely being mentioned by way of illustration.

Coming now to the drawings wherein like reference characters denote like parts throughout:

Figure 2 is a rear elevation of the camera shown in Figure 1.

Figure 3 is a fragmentary view partially in section showing a portion of the revoluble camera body mount and the frame which is supported by the lens board.

Figure 4 is a fragmentary sectional detail taken on line 4—4 of Figure 3 showing the latched structure in detail.

Figure 5 is a fragmentary detail of a portion of the friction device which is adapted to hold the camera body in a set position.

Figures 6 and 7 are diagrammatic views showing two different positions of the camera body relative to the lens board and objective.

Figure 1:
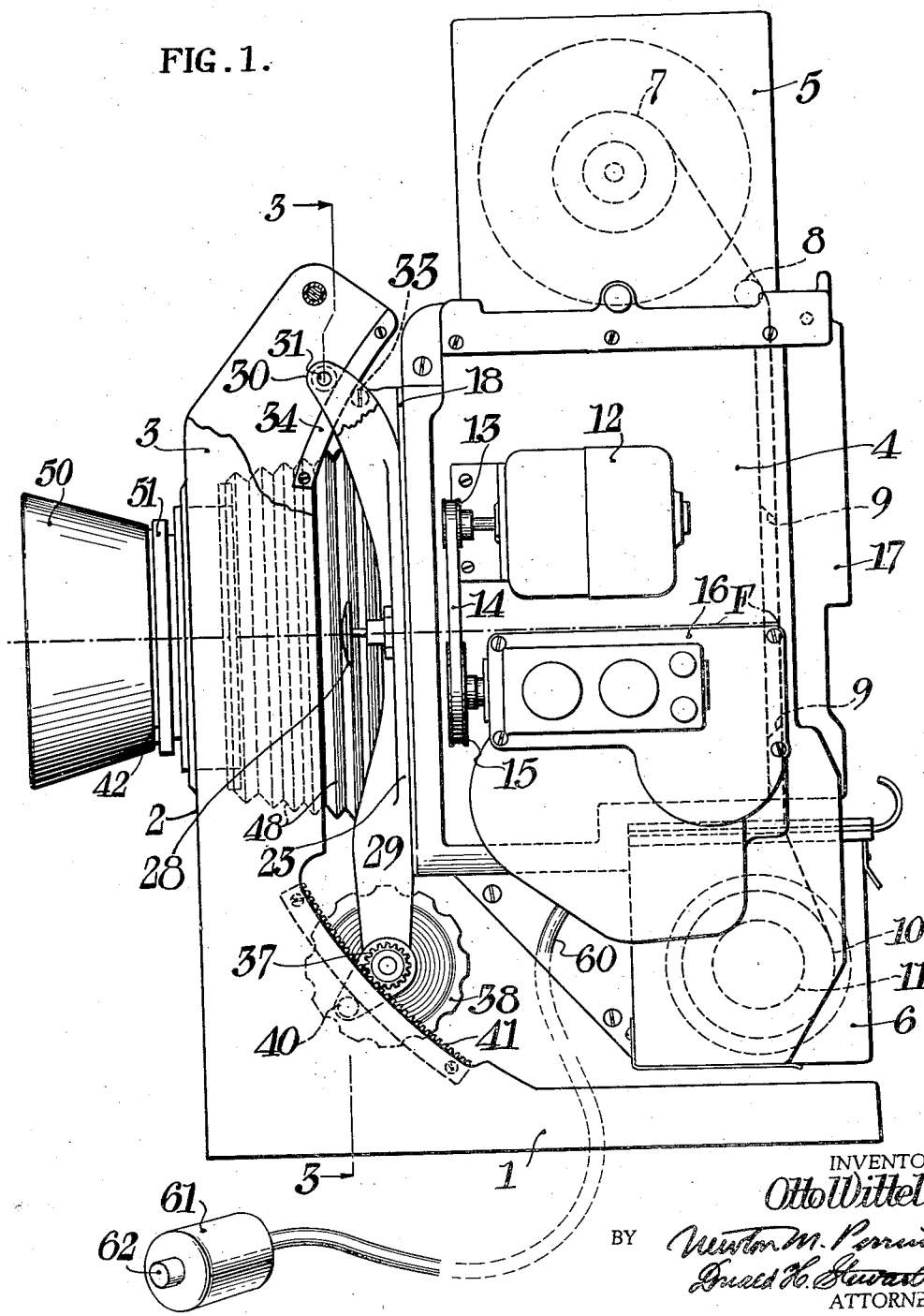
Figure 1 is a side elevation of a camera constructed in accordance with and illustrating a preferred embodiment of my invention.

A preferred embodiment of my invention is a camera adapted for studio use preferably driven by an electric motor so that an operator needs only to press a button to operate the shutter and wind a fresh section of film into place. By holding the button in a depressed position, a series of pictures can be rapidly made, the operation of the shutter and film-winding device being completely automatic.

The present invention is particularly directed to the structure of the camera in which the lens board of the camera supports the entire camera body as will be hereinafter more fully described.

Coming now to the drawings and particularly Figures 1 and 2, the camera preferably consists of a base member 1 supporting a lens board 2, this lens board preferably forming a part of a rigid frame having substantial upright side pieces 3. This entire structure will be referred to as the lens board and forms the main support for the camera which is broadly designated by the reference numeral 4.

The camera body 4 may include a supply film magazine 5 and a take-up film magazine 6, each of these magazines being movably mounted on the camera so that they can be readily loaded and unloaded.

Magazine 5 is adapted to receive a photographic light-sensitive strip of material such as film 7, this film normally passing over a guide roller 8, past an exposure frame 9 and then into the magazine 6 where it may be wound in a coil 10 upon a take-up hub 11.

The camera body 4 likewise carries a motor 12 which, through a pulley 13, belt 14 and pulley 15, is adapted to drive mechanism in the housing 16 for advancing the film and operating the shutter. As this mechanism forms no part of the present invention, it will not be herein more fully described.

The camera body 4 is provided with a removable back 17 which may be opened for initially threading film through the camera. The camera back construction forms the subject matter of my copending application, Serial No. 29,826, filed July 5, 1935.

The camera structure, which is the subject of the present application, will now be fully described.

On the front of the camera body 4 is a circular plate 18 as best shown in Figures 1 and 4, this circular plate having a recess 19 which is formed by an annular flange 20 attached to plate 18 in any suitable manner, as by screws 21. Thus the annular plate 20 forms a circular track which may engage a slot 22 in the annular member 23 to permit member 18 to rotate relative to member 23. In order to hold the parts in position for horizontal or vertical pictures, the latched member 24, which is pressed by a spring 25 into aperture 26 or 27 in plate 18 being operable by means of a handle 28, is employed. By pulling out the latched element from its aperture, the camera may be rotated through the annular connections between plate 18 and frame 23.

Frame 23, as best shown in Figure 3, is provided with a pair of similar side rails 29 having bearings 30 at the top carrying studs 31 on which the flanged wheels 32 may be revolubly supported. There are fixed studs 33 spaced from these wheels so that when the wheels 32 engage the curved rails 34 of the lens board 3, as shown in Figure 1, the fixed studs 33 will prevent the wheels 31 from leaving the rails.

On the opposite ends of the frame members 29 there are bearings 35 revolubly supporting a shaft 36 to the ends of which gear wheels 37 are pinned so as to turn with the shaft. Also affixed to shaft 36 is a hand wheel 38 by which the shaft may be manually turned. Spaced from the gear wheels 37 on brackets 39 are fixed pins 40 which, as best shown in Figure 1, lie on the opposite side of the curved rack track members 41 to prevent the gear wheels 37 from leaving the track.

As will be obvious, when the hand wheel 38 is turned, the gear wheels 37 meshing with the racks 41 will cause the frame 23 to move or rock upon the lens board 3 and, since the camera body is totally carried by the frame 23, the camera will likewise rock. The curvature of the rails 34 and 41 is such that the camera body will be rocked substantially about a point F which lies on the axis of the objective carried by the lens cell 42, so that, while the camera is moved upon these rails, the central part of the film will remain in substantially the same position with respect to the objective. This is usual in portrait work because it enables an operator to throw portions of the top or the bottom of the image out of focus.

The operator may focus on a ground glass through the hood 43 and the eyepiece 44, although this does not form a part of the present invention.

The frame 23, as shown in Figure 3, is provided with an elongated opening 45 through which light rays pass to the film, and around this opening is a frame 46 which may be attached to member 23 by screws 47 and which holds the inner edge of a bellows 48 connecting the frame member 23 with the lens board 3, the front edge of the bellows being attached to the lens board in a way similar to that in which it is attached to member 23. The bellows 48 is of the usual structure—that is, it is flexible—so that the camera body may move relative to the lens board without permitting light to enter between these parts.

As diagrammatically illustrated in Figures 6 and 7, the camera body 4 can be moved on the rails 34 and 41 so as to bring either an upper part U of the film 7 nearer to the lens board (when in the position shown in Figure 6) or the lower part L of the film closer to the lens board (as when in the position shown in Figure 7). These two views show substantially the two extremes of movement which can be procured, although it is to be understood that it is very seldom that the camera is used in these two extreme positions. However, it is frequently necessary to use a slight amount of this rocking movement to throw portions of a subject into or out of focus, as is well known to portrait photographers.

As above explained, the camera mechanism is operated through the motor 12 and through mechanism in the housing 16, this being preferably controlled by means of a cable 60 carrying electric wires to a switch member 61 which can be closed by operating the switch button 62. This structure does not form a part of the present invention but is merely described so that the operation of the camera can be better visualized.

In order to hold the shaft 36 in the position in which it is set by the hand wheel 38, the following structure is employed: Two collars 70 are mounted upon the shaft 36 and are normally thrust apart by means of the spring 71. The collars may slide upon the shaft 36 but must turn with the shaft because of the pins 72 which engage slots 73 in the collars. At the opposite ends of the collars from that contacting with a spring 71 there is a tapered recess 74 adapted to engage a cone-shaped friction washer 75 which may be attached as by a screw 76 to the bearing member 35.

Consequently, the spring 71 creates sufficient outward pressure against the sleeve 70 to cause substantial friction between the cone-shaped inner engaging members 74 and 75, and the parts will remain in any position to which they are set by means of the hand wheel 38.

The structure of the take-up magazine 6 is the subject matter of a third co-pending application, Serial No. 51,295, filed November 23, 1935, for camera magazine.

The operation of the camera structure above described is quite simple, since the operator views the image on a ground glass through the eyepiece 44, and may focus the camera by turning the sleeve 50 which moves the objective to the desired position. The diaphragm may be adjusted by turning the adjustable collar 51. If it is desirable to select a vertical picture area, the plunger 28 may be drawn out against the pressure of spring 25 and the camera body may be sprung bodily upon the inter-engaging annular members 22 and 20 until the plunger 24 engages aperture 28. The parts will then be positioned as shown in Figure 1.

If, after focusing, it is found that the top or the bottom of the picture requires adjustment relative to the focal plane, the operator may turn handle 38 to rock the camera body 4 toward the position shown in Figure 6 or 7, as may be required.

What I claim as my invention is:

1. In a photographic camera, the combination with a base, of a lens board carried by the base, a camera body, and means separate from the base and including cooperating parts on the camera body and lens board for totally supporting the camera body from the lens board.

2. In a photographic camera, the combination with a base, of a lens board carried by the base, a camera body, and means separate from the base and including cooperating parts on the camera body and lens board for totally supporting the camera body from the lens board, said cooperating parts including means for moving the camera body relative to the lens board.

3. In a photographic camera, the combination with a base, of a lens board carried by the base, a camera body, and means including cooperating parts on the camera body and lens board and separate from the base for totally supporting the camera body from the lens board and a flexible bellows connecting the lens board and camera body.

4. In a photographic camera, the combination with a base, of a lens board carried by the base, a camera body, and means including cooperating parts on the camera body and lens board for totally supporting the camera body from the lens board, said means comprising track elements on one part and track engaging rollers on the other track whereby the camera body may be moved upon its lens board support.

5. In a photographic camera, the combination with a base, of a lens board carried by the base, a camera body, and means including cooperating parts on the camera body and lens board for totally supporting the camera body from the lens board, said means comprising curved tracks on the lens board and rollers carried by the camera body and engaging said tracks whereby the body may be moved relative to the lens board, and light tight flexible connections between the lens board and camera body.

6. In a photographic camera, the combination with a base, of a lens board carried thereby, curved rails on the lens board, a camera body, rail engaging wheels carried by the camera body for supporting it from the rails, and means tending to hold at least one wheel in a desired position on a rail.

7. In a photographic camera, the combination with a base, of a lens board carried thereby, curved rails on the lens board, a camera body, rail engaging wheels carried by the camera body for supporting it from the rails, at least one of said rails comprising a rack, at least one of said wheels carried by the camera body including teeth adapted to mesh with the rack track.

8. In a photographic camera, the combination with a base, of a lens board carried thereby, curved rails on the lens board, a camera body, rail engaging wheels carried by the camera body for supporting it from the rails, at least one of said rails comprising a rack, at least one of said wheels carried by the camera body including teeth adapted to mesh with the rack track and a knob for turning said toothed wheel on said rack to alter the position of said camera body on said lens board.

9. In a photographic camera, the combination with a base, of a lens board carried thereby, curved rails on the lens board, a camera body, rail engaging wheels carried by the camera body for supporting it from the rails, at least one of said rails comprising a rack, at least one of said wheels carried by the camera body including teeth adapted to mesh with the rack track and a knob for turning said toothed wheel on said rack to alter the position of said camera body on said lens board and a friction clutch tending to hold the camera body in a set position on said lens board rails.

10. In a photographic camera, the combination with a base, of a lens board including an objective carried thereby, curved rails on the lens board, a camera body including means for defining a focal plane, rail engaging wheels carried by the camera body for supporting it from the rails, the curvature of the rails being such that movement of the camera body thereon will not materially alter the distance between the objective and a central part of the focal plane defined in the camera.

11. In a photographic camera, the combination with a lens board, a base for supporting the lens board, a camera body totally and movably mounted on the lens board, said camera body including relatively slidable annular members and means for holding the camera in either a horizontal or vertical position thereon.

12. In a photographic camera, the combination with a lens board, a base for supporting the lens board, a camera body including an annular track, a frame engaging said annular track in which the camera may turn, means on said frame for engaging the lens board, whereby said camera may be totally supported through the frame by the lens board.

13. In a photographic camera, the combination with a lens board, a base for supporting the lens board, a camera body including an annular track, a frame engaging said annular track in which the camera may turn, means on said frame for engaging the lens board, a flexible bellows connecting the frame and lens board and means including cooperating parts on the lens board and frame for totally supporting the camera from the lens board.

14. In a photographic camera, the combination with a lens board, of a frame carried by and movable on the lens board, a flexible bellows connecting the frame and lens board, a camera body totally supported by the frame, and a revoluble mount between the frame and camera on which the latter may be turned to horizontal and vertical positions.

15. In a photographic camera, the combination with a lens board, of a bellows having one end attached thereto, a frame carrying the other end of said bellows, and means for supporting said frame on said lens board.

16. In a photographic camera, the combination with a lens board, of a bellows having one end attached thereto, a frame carrying the other end of said bellows, and movable connections between the lens board and the frame for movably supporting the latter by the former.

17. In a photographic camera, the combination with a lens board, of a bellows having one end attached thereto, a frame carrying the other end of said bellows, and movable connections between the lens board and the frame for movably supporting the latter by the former, said movable connections including cooperating friction elements on the two parts tending to hold the frame in a set position on said lens board.

18. In a photographic camera, the combination with a lens board including an objective the axis of which is at right angles to the lens board, of a camera body adapted to hold sensitized material in a plane at right angles to the lens axis and at a predetermined distance therefrom, connections between the lens board and camera body for totally supporting the latter by the former, said connections being positioned to permit movement of the camera body about an axis transverse of the lens axis at approximately the point where said axis passes through the focal plane of the sensitized material.

OTTO WITTEL.